(12) United States Patent
House et al.

(10) Patent No.: US 7,958,116 B2
(45) Date of Patent: Jun. 7, 2011

(54) SYSTEM AND METHOD FOR TRANS-FACTOR RANKING OF SEARCH RESULTS

(75) Inventors: Tip House, Worthington, OH (US); Ron Buckley, Dublin, OH (US); Gary Perlman, Westmount (CA)

(73) Assignee: OCLC Online Computer Library Center, Inc., Dublin, OH (US)

( * ) Notice: Subject to any disclaimer, the term of this patent is extended or adjusted under 35 U.S.C. 154(b) by 434 days.

(21) Appl. No.: 12/167,366

(22) Filed: Jul. 3, 2008

(65) Prior Publication Data

US 2009/0019035 A1   Jan. 15, 2009

Related U.S. Application Data

(60) Provisional application No. 60/948,363, filed on Jul. 6, 2007.

(51) Int. Cl.
*G06F 17/30* (2006.01)
(52) U.S. Cl. ....................................... 707/723
(58) Field of Classification Search .................... 707/723
See application file for complete search history.

(56) References Cited

U.S. PATENT DOCUMENTS

| 6,185,558 | B1 | 2/2001 | Bowman et al. |
| 6,356,899 | B1 | 3/2002 | Chakrabarti et al. |
| 6,751,612 | B1 | 6/2004 | Schuetze et al. |
| 7,370,034 | B2 * | 5/2008 | Franciosa et al. ............. 707/749 |
| 2002/0123994 | A1 * | 9/2002 | Schabes et al. .................... 707/5 |
| 2004/0117352 | A1 * | 6/2004 | Schabes et al. .................... 707/3 |

* cited by examiner

*Primary Examiner* — Sheree Brown
(74) *Attorney, Agent, or Firm* — Standley Law Group LLP

(57) ABSTRACT

A system and method for trans-factor ranking of search results. Any number of attributes of items in a database being searched may be synthesized into a uniquely suitable ordering that brings relevant and authoritative results to the top of the list whenever such results exist in the database. The manner in which the attributes are used to create this ordering may be varied by users to tailor the ranking to their needs, and by database providers to take advantage of unique database contents. Attributes that are not in the database may be created dynamically and used to synthesize the order, based on the intersection between attributes that do exist in the database and attributes that are associated with the user or database manager. Attenuation and amplification factors are applied to attributes to control rankings. A multi-ranking interleaver determines a final ordering when more than one ranking strategy is used.

15 Claims, 8 Drawing Sheets

OCLC shakespeare [Find]

WorldCat.org
(123234492Records)

Showing 1-10 results of about 71838 for shakespeare (0.13 seconds.)

| Relevancy Mixer | | | Hide |
|---|---|---|---|
| Popularity | Age | Fields | |
| ○+2 | ○+2 | ○+2 | |
| ○+1 | ○+1 | ○+1 | |
| ⊙ | ⊙ | ⊙ | |
| ○-1 | ○-1 | ○-1 | |
| ○-2 | ○-2 | ○-2 | |

|  | -2 | -1 | ⊙ | 1 | 2 |
|---|---|---|---|---|---|
| Title: | ⊙ | ○ | ○ | ○ | ○ |
| Author: | ○ | ○ | ○ | ○ | ⊙ |
| Subject: | ○ | ⊙ | ○ | ○ | ○ |

210
212

214—

<u>norton shakespeare</u> by shakespeare william 1564-1616
... oxford edition | 1997 | shakespeare, william | ..., andrew | norton shakespeare norton shakespeare...by andrew gurr | shakespeare, william | ...269327 /xwc shakespeare william 1564-1616
Libs: 47437 Lang:eng Year:1997 Relevance:108320000 WorldId:269327 Manifestations: (bks:2167 com:26 rec:7 ser:2 url:27)

<u>henry the fourth part one</u> by shakespeare william 1564-1616
| william shakespeare fully annotated...by harold bloom | shakespeare, william | 1564-1616 | william shakespeare fully annotated...2006 | the annotated shakespeare | yale university...one the annotated shakespeare | yale university
Libs: 585 Lang:eng Year:2006 Relevance:93330000 WorldId:3365774 Manifestations: (bks:4 rec:8)

FIG-2B

SYSTEM AND METHOD FOR TRANS-FACTOR RANKING OF SEARCH RESULTS

CROSS-REFERENCE TO RELATED APPLICATION

This application claims priority to U.S. Provisional Patent Application Ser. No. 60/948,363, filed Jul. 6, 2007, titled SYSTEM AND METHOD FOR RANKING SEARCH RESULTS which is incorporated herein by reference.

FIELD OF INVENTION

The present invention relates generally to information retrieval systems and search engines. In particular, the present invention is directed to a system and method for trans-factor ranking of search results.

BACKGROUND OF THE INVENTION

Search engine technology facilitates retrieval and review of information from large databases. Once the entries from the database matching a user's search criteria are located, the search engine applies various rules or logic to rank the results so the results are displayed in order of relevance with respect to the user's search criteria. While search engine optimization techniques as well as ranking techniques continue to improve users' experiences with search engines and increase the likelihood that the results are presented in a relevant and meaningful order, the relevance and ranking of the results is determined by the search engine. Typically, the ranking is fixed such that the only way to change the results relevance and ranking analysis to is rerun the search with slightly different search criteria. The results ranking, therefore, is only as good as the search engine's interpretation of the user's needs. Users that have difficulty in specifying search criteria that reflects what they really want may find themselves reviewing numerous hits with the hope that one or more hits answers the real question at issue. The process of stepping through the hits can be daunting. Patient users may review tens or hundreds of results hoping to find the answer or they run numerous searches with varying criteria. Users with less patience may simply give up.

Various attempts to increase the accuracy of search results have been made. Most efforts focus on the rules or logic of the search engine to improve methods for calculating final relevance scores and then ranking results according to relevance scores. Although improving search engine functionality is helpful, most search engine ranking systems and methods limit the factors that are considered in determining relevance scores. Furthermore, they do not allow users to manipulate search results or provide only limited capabilities to manipulate search results. Finally, they do not account for attributes that are not necessarily present in the query results but that may be important to a user in ranking search results. There is a need for database search results ranking system and method that allows a user to control the selection of the items to display, in response to a search query producing more matches than can be displayed at one time, in such a way that the selected items are of the most use to the user submitting the query, and the items not selected are the least useful. There is a need for a system and method of ranking search results that supports trans-factor ranking.

SUMMARY OF THE INVENTION

The present invention is a system and method for trans-factor ranking of search results. The present invention allows any number of attributes of items in a database being searched to be synthesized into a uniquely suitable ordering that brings highly relevant and authoritative results to the top of the list whenever such results exist in the database. Moreover, the invention allows the manner in which the attributes are used to create this ordering to be varied at will by individual search users to tailor the ranking to their individual needs, and by database providers to take advantage of unique database content, and by portal providers to focus on the needs of specific user communities. Furthermore, the present invention allows attributes that are not in the database to be created dynamically and used to synthesize the order, based on the intersection between attributes that do exist in the database and attributes that are associated with the user, database manager, or portal owner at the time of the search.

In an example embodiment of the present invention, there are several components that work together to synthesize a trans-factor ranking, including:

A Ranking Control Harness;
A Query Density Analyzer;
A Dynamic Attribute Writer;
A Sort Order Synthesizer; and
A Multi-Ranking Interleaver.
A brief description of each component follows.
The Ranking Control Harness This component provides the ability to control the workings of the trans-factor ranking synthesis so that its behavior can be suitably tailored to individual users, specific databases, and particular portals. These controls allow the following specifications to be set on a per-search basis:

The set of individual item attributes to be used to produce the ordering;
Attenuation and amplification factors for each item in the attribute set;
Combination modifiers for each item in the attribute set that affect when and how the factor is utilized during sort order synthesis;
Specifications for deriving additional attributes for items based upon the interaction between existing item attributes and supplied rules and data; and
Rules for interleaving multiple rankings into a final ordering.

The Query Density Analyzer

The query density analyzer determines how closely each item in the result set is related to the search query. It utilizes an in-memory representation of each item in the database that includes information about every word in the item, including the order in which they occur and the distance from one word to another. The search query is transformed into a similar representation, and then each unique occurrence of the query within each item that matched the search is located and scored based on the how many extraneous words occur within the boundaries of the query occurrence, and the extent to which the order of words within the occurrence are permuted from the order within the query. The scores for the individual occurrences within each item are then combined into a single, composite scalar value for each matching item. If related-word equivalency is configured via the ranking control harness, then the query density analyzer considers a sequence of related words of the query terms (e.g., plural .vs. singular forms of the word, or alternate spellings of the word) to be an occurrence of the query and scores it accordingly.

The Dynamic Attribute Writer

This component creates new attributes for items at ranking time that can be combined with other static and dynamic attributes to provide the desired ordering. Dynamic attributes are not solely associated with items in the database, but are instead created through the interaction of a search user with the item at search time. For example, a static attribute of an item might be item language, used in ranking when items in a specific language are more useful, such as for a Spanish language internet portal. For a multilingual portal, on the other hand, items in each individual user's native language are the most useful, and a dynamic attribute is used to reflect the extent to which an item's language matches the users' native language.

The Sort Order Synthesizer

The sort order synthesizer combines the specified static and dynamic attributes of each item, and the outputs of the query density analyzer, in order to create a single, composite scalar ranking score for each item. The attenuation and amplification factors from the control harness are used by this component during the synthesis, as are the combination modifiers, which determine whether factors are intrinsic or extrinsic. Intrinsic factors are applied during a power series computation that ties the influence of the factor to the query density. This is most appropriate when the utility of items along this factor is dependent on the relevance of an item to the query terms. For instance, items in a user's native language are more useful than those in other languages, but not if they have little or no relation to the query. Extrinsic factors, whose influence are orthogonal to the query density, are applied after the power series computation.

The Multi Ranking Interleaver

This component produces the final results ordering when more than one ranking strategy has been specified. In this case, there will be several independently computed scalar ranking scores for each item. The multi ranking interleaver first creates a separate ordered list of matching items for each ranking score, then processes the lists simultaneously to create a modified fair interleaving of the lists for the final order. A fair interleaving is one in which an item is selected alternately from each list. The modified fair interleaving involves a one-round tie breaker to pick a preferred item from among the lists so that no more than two successive items are ever selected from the same list.

BRIEF DESCRIPTION OF THE DRAWING(S)

FIGS. 2A and 2B illustrates trans-factor ranking tailored through the user interface to suit the particular needs of the user.

Figure 7:
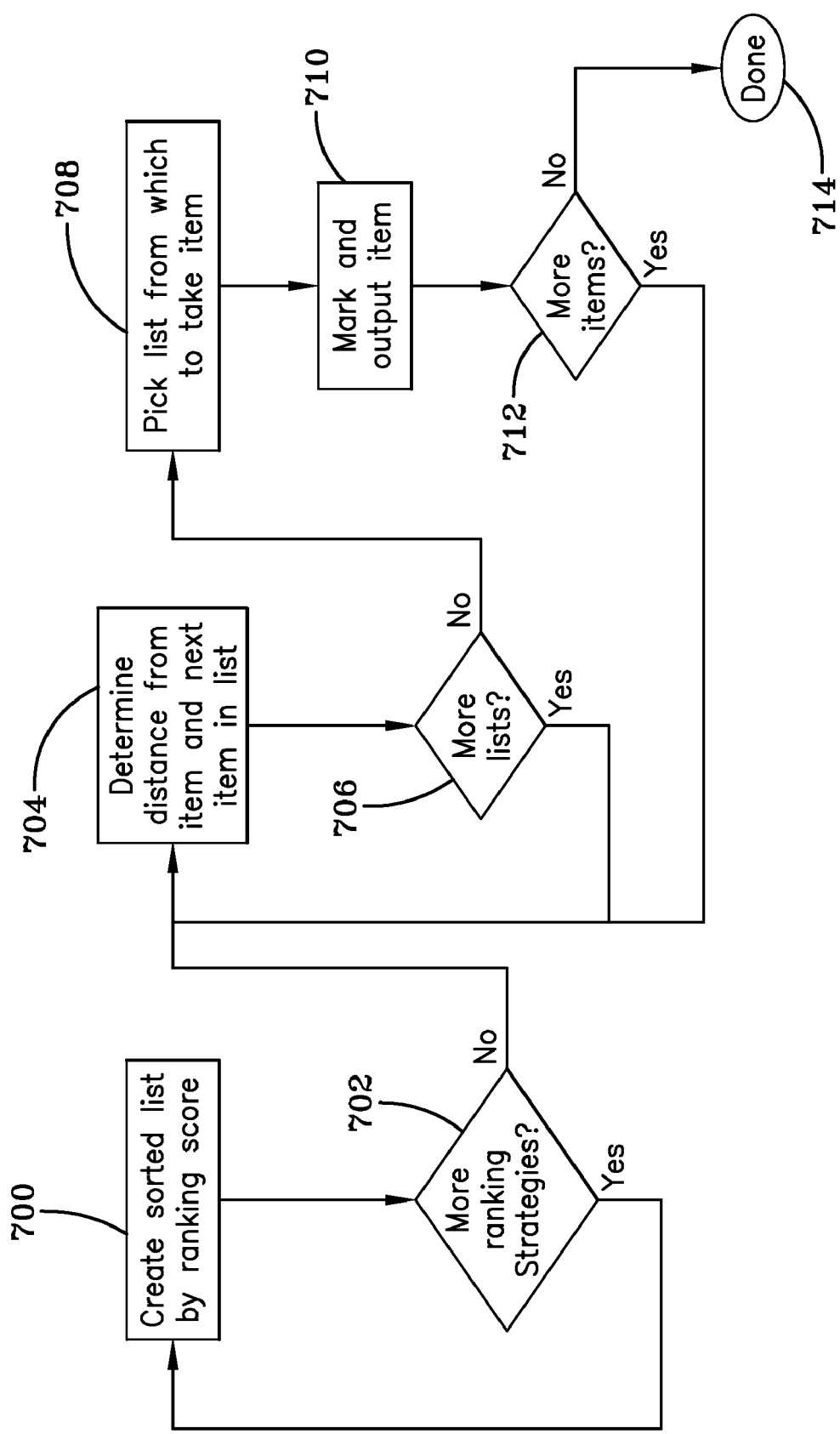

FIG. 7 outlines the logic used in the Multi-Ranking Interleaver to produce a final single ordering based on more than one ranking strategy.

DETAILED DESCRIPTION OF AN EXAMPLE EMBODIMENT(S)

Figure 1:
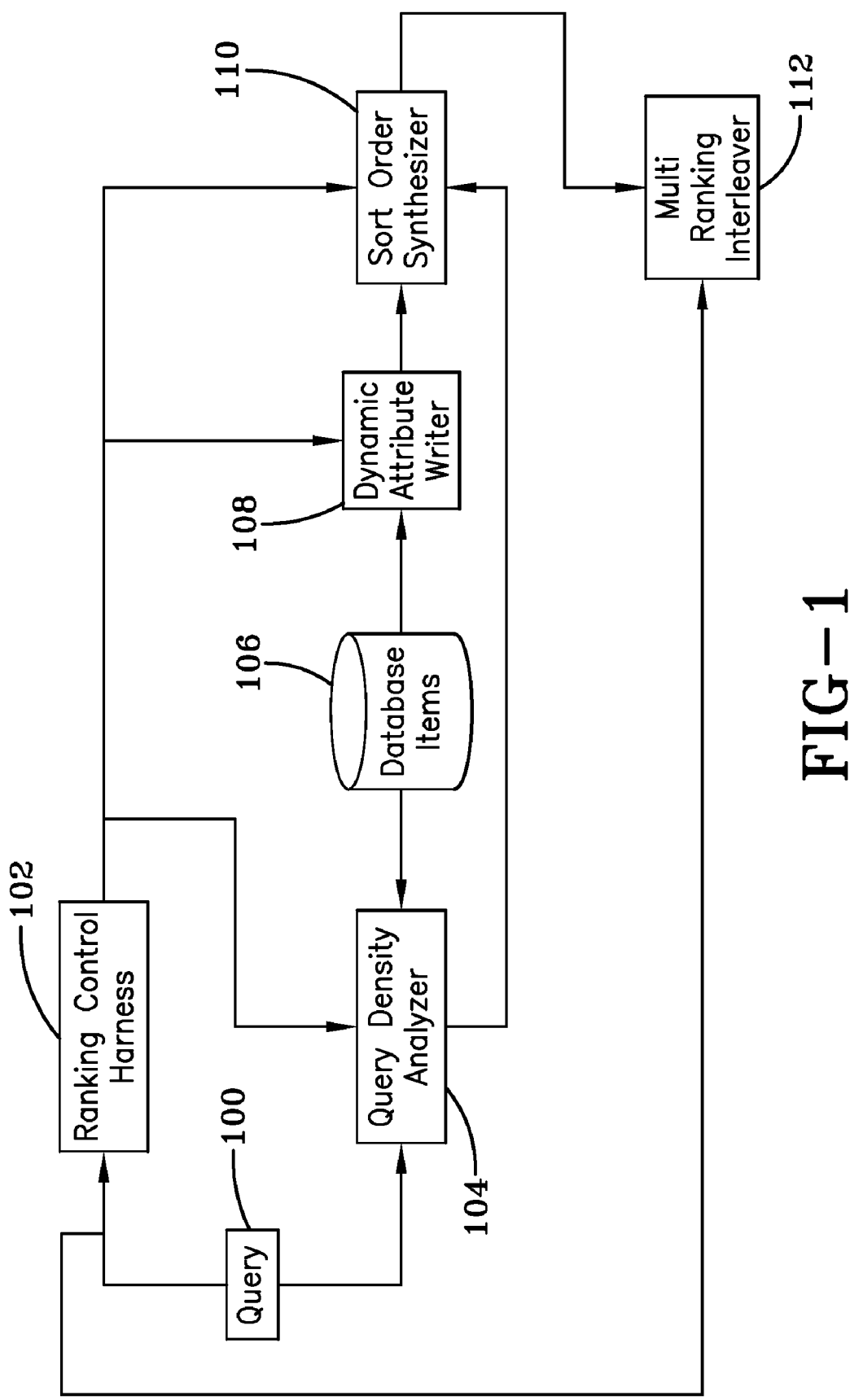
FIG. 1 illustrates the primary components of the trans-factor results ranking invention, including the general flow of information from the user query and database through the various components.

In accordance with one embodiment of the present invention, results of a bibliographic database query are ranked and displayed. FIG. 1 shows trans-factor ranking synthesis for a search engine. As shown, the search query 100 is used by the Query Density Analyzer 104 in conjunction with the database items that match the search query to produce the input to the Sort Order Synthesizer 110. The query is also used by the Ranking Control Harness 104 to acquire tailoring information which it then passes on to each of the other components. The database items 106 are also used by the Dynamic Attribute Writer 108 to create dynamic attributes for use by the Sort Order Synthesizer 110. The Dynamic Attribute Writer 108 also uses information acquired by the Ranking Control Harness 102. The Sort Order Synthesizer 110 combines the query density, static attributes from the database items, and dynamic attributes from the Dynamic Attribute Writer 108 to create one or more scalar ranking scores for each matching item. The output of the Sort Order Synthesizer 110 is passed to the Multi Ranking Interleaver 112 to create a single ordering of the results according to information acquired by the Ranking Control Harness 102 and the scores computed by the Sort Order Synthesizer 110. Software components that provide the features and functionality of the Ranking Control Harness, the Query Density Analyzer, the Dynamic Attribute Writer, Soft Order Synthesizer, and Multi-Ranking Interleaver may be operational at a server computer that receives queries from user computers, locates matches from the database 106, and displays results according to rankings determined according to the present invention.

Figure 2A:
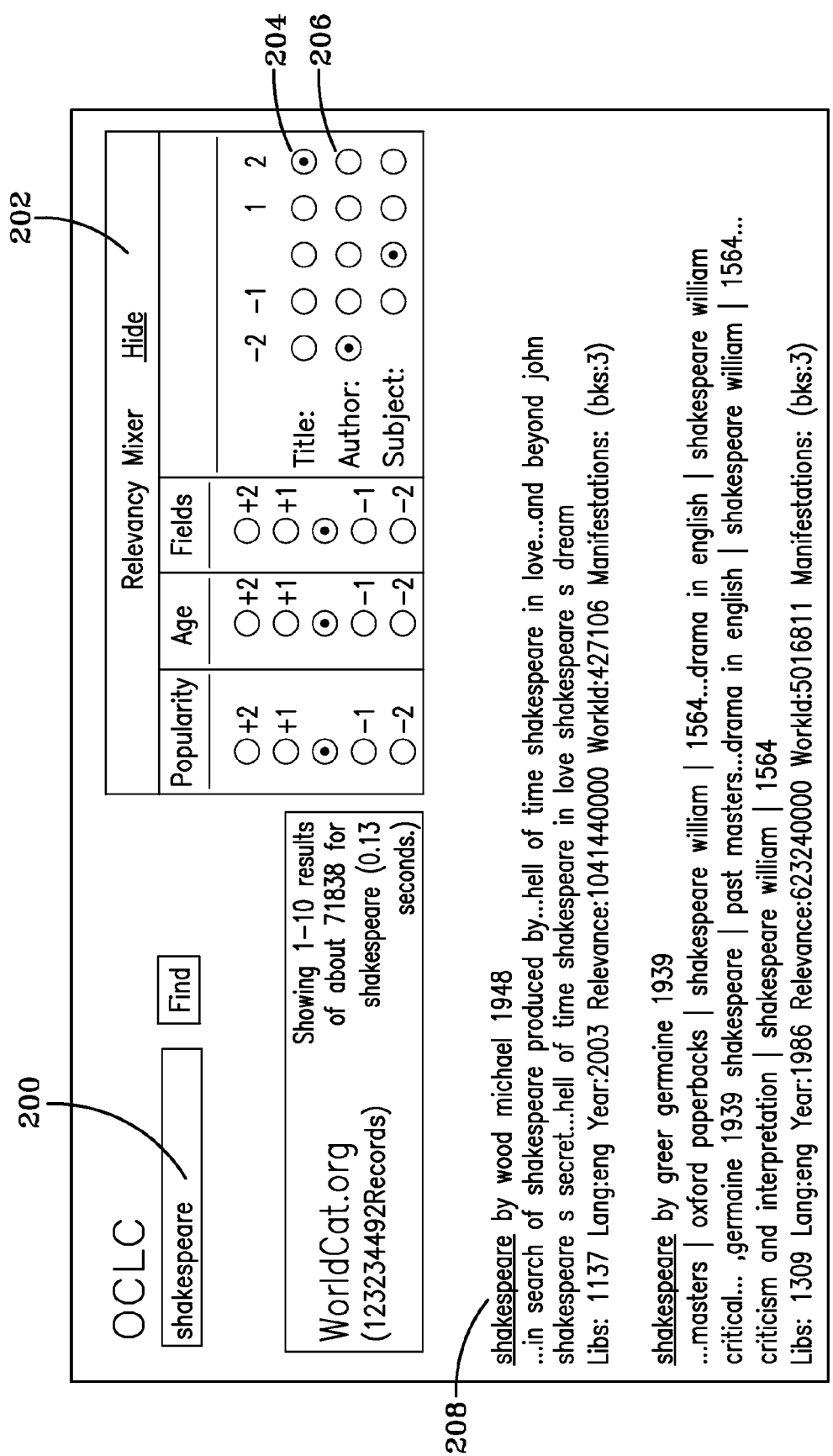

FIGS. 2A and 2B show an embodiment of a simple computer user interface providing user access to and control over trans-factor ranking synthesis via amplification and attenuation controls 202 on factors for specific attributes of database items from the bibliographic database. As shown in FIG. 2A, amplifying the title 204 and attenuating the author 206 results items titled with the query 200 displaying first, whereas amplifying author 212 and attenuating title 210 as shown in FIG. 2A results in items authored by the query term to display.

Referring to FIGS. 2A and 2B, examples of multi-factor ranking using age, popularity, author, title, and subject attributes of database items 202 (FIG. 2A), and dynamically tailored by a user are shown. Referring to FIG. 2A, with the title boosted and the author cut, items with query in the titles rise to the top of the list 208. Referring to FIG. 2B, with the author boosted and the title cut, items with the query terms in the author field rise to the top of the list 214.

Table 3 illustrates a particular embodiment of the control harness parameters for trans-factor ranking synthesis.

TABLE 3

Example ranking control harness URL parameters for multifactor ranking:

group=$interl.1.1
$sort–$sum.cg
$sort–$max.cg.$d
rankboost=ta*8
ap*4
su*2
colboost=/XWC!100
langboost=ln!250

These parameters provide an example of controls for a ranking similar to that illustrated in FIGS. 2A and 2B. These parameters originate either from the user explicitly, or from an intermediate entity that has configured the database or the portal through which the search originates, or a combination of the two.

In this embodiment, the ranking control harness parameters are entities on an HTTP url (Uniform Resource Locator), of the form http://<someserver>/<serverspecific>?entity1=value1&entity2=value2&. The entity names appear on the left side of the equal symbol, and the values on the right side. In some cases, entities may have more than one value. In this embodiment, multiple values are separated by spaces.

The control harness parameters illustrated in Table 3 define, for this embodiment, the following ranking:

Two ranking strategies are employed, a trans-factor synthesis of query density, item popularity, item age, author, title, and subject. These are then interleaved to produce the final ordering.

In the trans-factor ranking, title, author, and subject are intrinsically amplified by factors of 8×, 4×, and 2× respectively.

Items with a collection attribute that is not /XWC are extrinsically attenuated by a factor of 100×.

Items for which the item language attribute does not match the value In are extrinsically attenuated by a factor of 250×.

Figure 3:
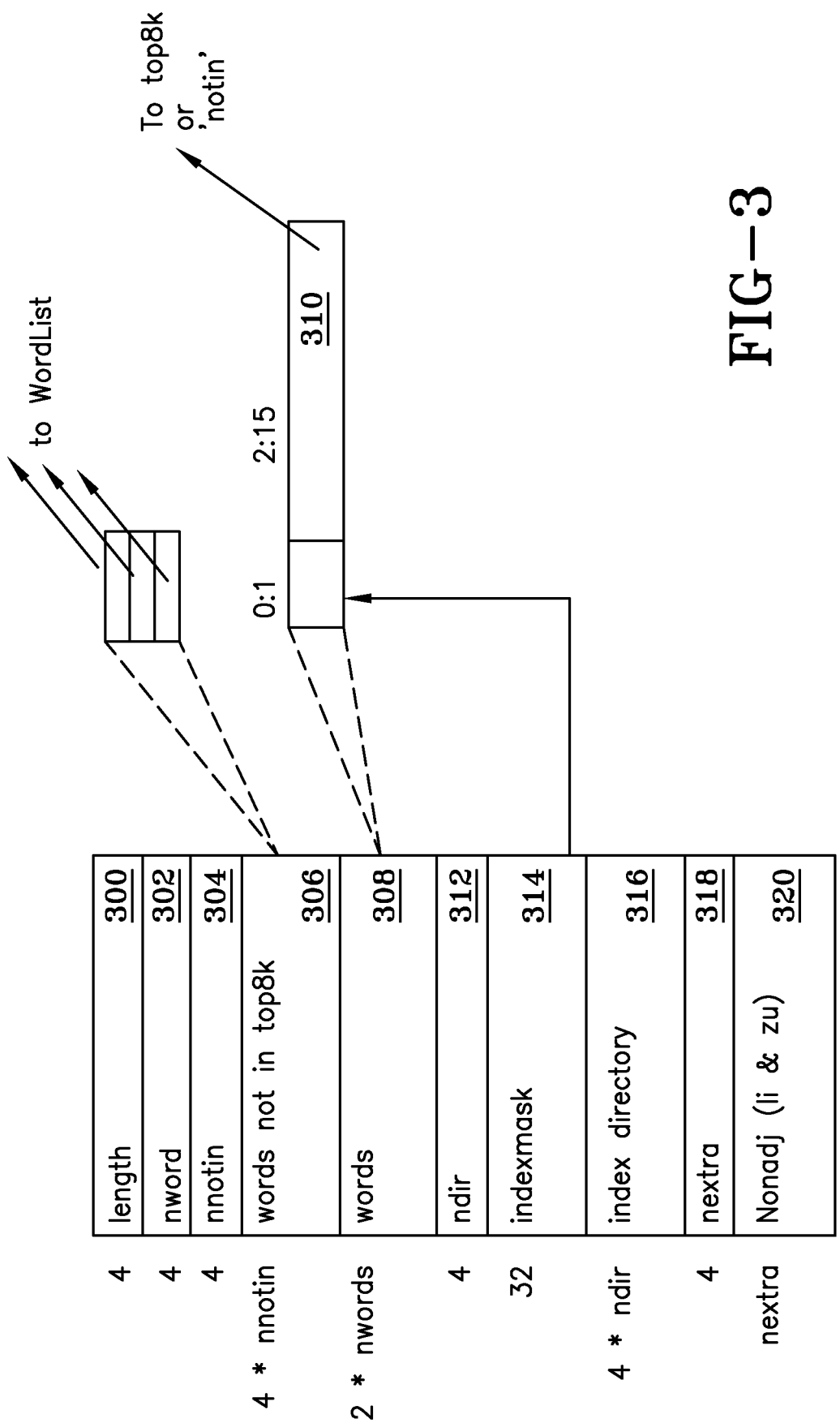
FIG. 3 illustrates the structured used by the query density analyzer. Such a structure is maintained in memory for each item in the database.

FIG. 3 outlines the memory structure used in this embodiment to analyze the query density for each item that matches the search query. Each item has an associated memory structure of this form. The first entry in the structure is a length field 300 that contains the total length of the structure, followed by a count of the number of words occurring within the item 302, and a count of the subset of those words that are not among the most frequently occurring words in the database for a particular threshold 306 (e.g., 8K or 7,691). This in turn is followed by a four-byte entry for each unique occurrence of the non-top-occurring words that in turn identifies the specific word 308. A series of 2 byte entries follow this, one for each word that occurs in the item 310. These two byte entries contain 2 bits that indicate if the word is followed by a space or is the last word in a field, and 14 bits that identify the specific occurring word. That is followed by a count of the number of different indexes by which the item is indexed 312, and a mask 314 and directory 316 containing information on which indexes contain at least one word for this item and which words in the item occur in which indexes.

Figure 4:
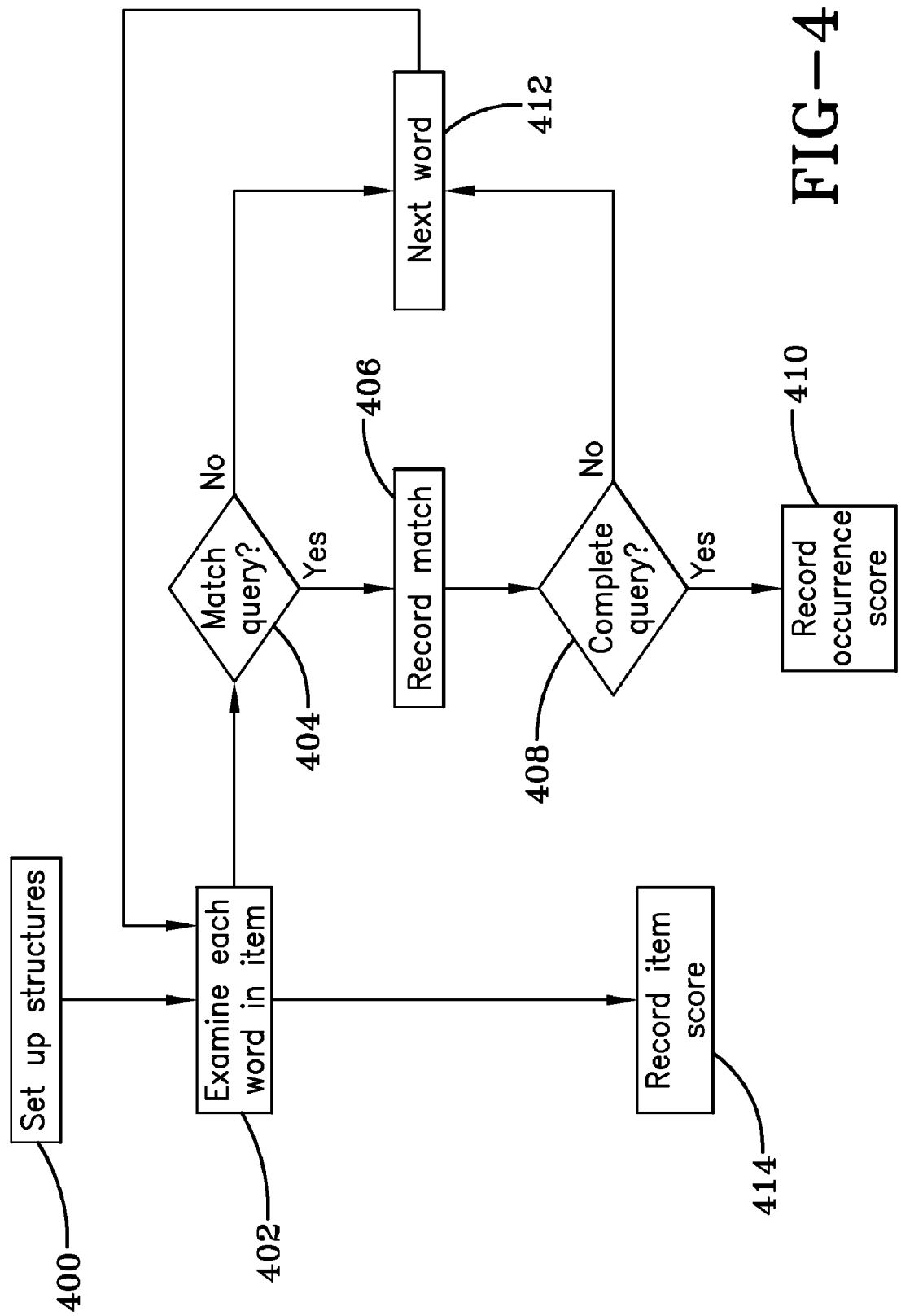
FIG. 4 illustrates the basic flow in the query density analyzer component.

FIG. 4 shows the logic employed by the Query Density Analyzer component to analyze the query density for a single matching item. As shown, the first step is to set up temporary structures that are used during analysis 400. These include a list of any NOT operators and the associated terms in the query, a list of any terms that appear multiple times in the query, and a list of wild-card terms within the query (terms that match a range of values).

Each word within the item is then examined for a match with the query 402. Any match 404 is recorded 406 and the term within the query is advanced for the purposes of the next examination of an item word 412. When all words within the query have been matched 408, a score is computed for that occurrence of the query 410. These scores consist of maintaining counts for the number of times the query occurs in the item in the correct order with no intervening words and with one, N, and 2N intervening words, where N is the number of words within the query.

After each word has been examined, a composite score is recorded for the item that includes the counts from all of the occurrences 414.

Figure 5:
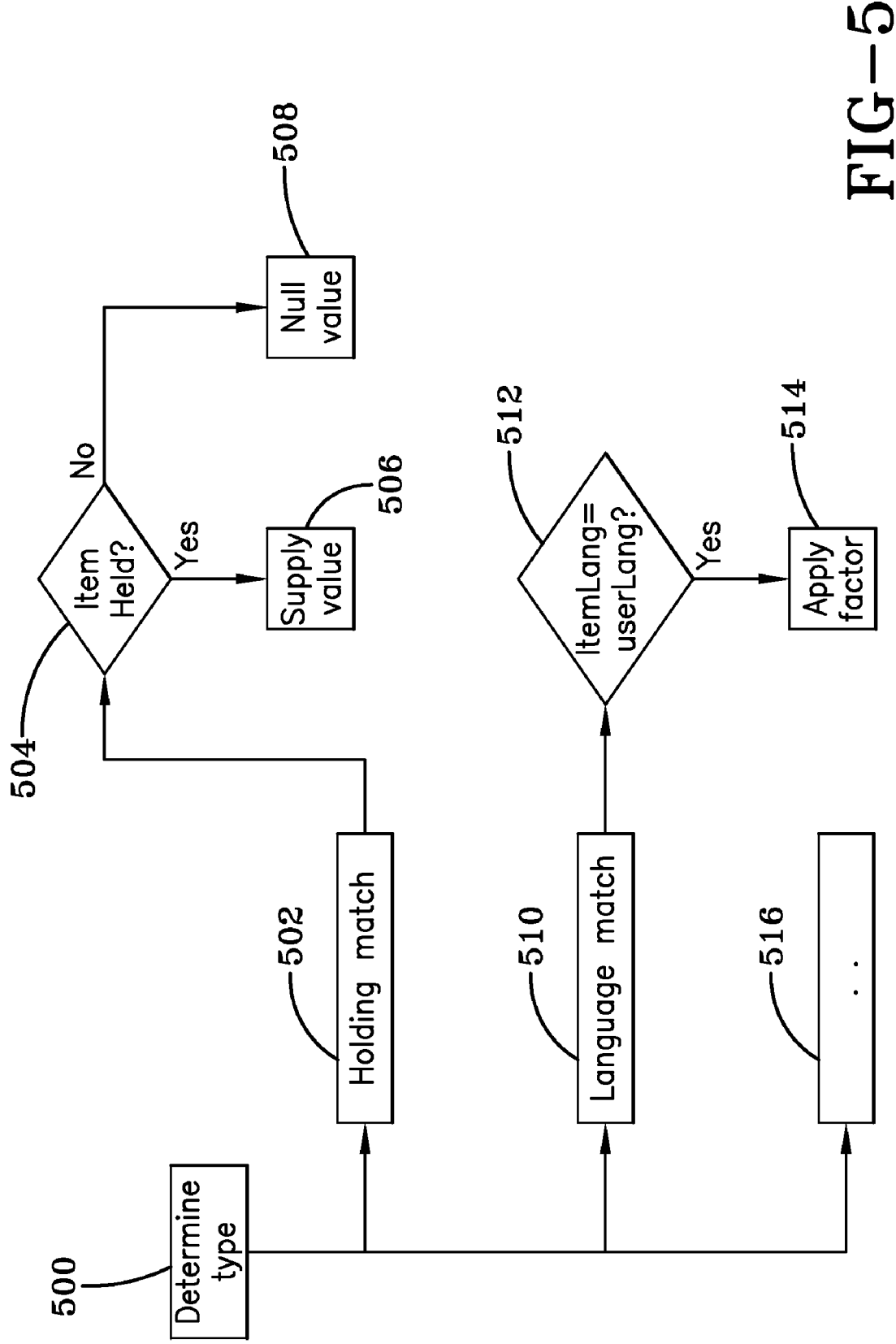
FIG. 5 illustrates the logic employed by the dynamic attribute writer for a dynamic language attribute and a dynamic holdings attribute.

FIG. 5 outlines the processing performed by the Dynamic Attribute Writer for two sample dynamic attributes: holding match and language match. The first step determines the type of dynamic attribute to be created 500.

For a holding match dynamic attribute 502, a determination is made as to whether or not the given item is held by an institution or group of institutions to which the search user is affiliated 504. This determination involves examining attributes of the item that indicate which institutions have the item and the attributes, a separate collection of items that indicate which institutions are in groups together, and a list of group and institution identifiers acquired by the ranking control harness that specifies which institutions and groups with which the user is affiliated. Depending upon whether the item is held by an affiliated institution 506, by an institution that is a member of an affiliated group 506, or by none of the above 508, a dynamic attribute is created with values of 0, 1, and 2, respectively.

As shown in FIG. 5, similar processing occurs for a language match 510, but in that case, the language attribute of the item is compared to a language list acquired by the Ranking Control Harness 512. If a match occurs, then an associated attenuation or amplification factor is applied, either intrinsically or extrinsically 514. Other attributes may be processed similarly 516.

Figure 6:
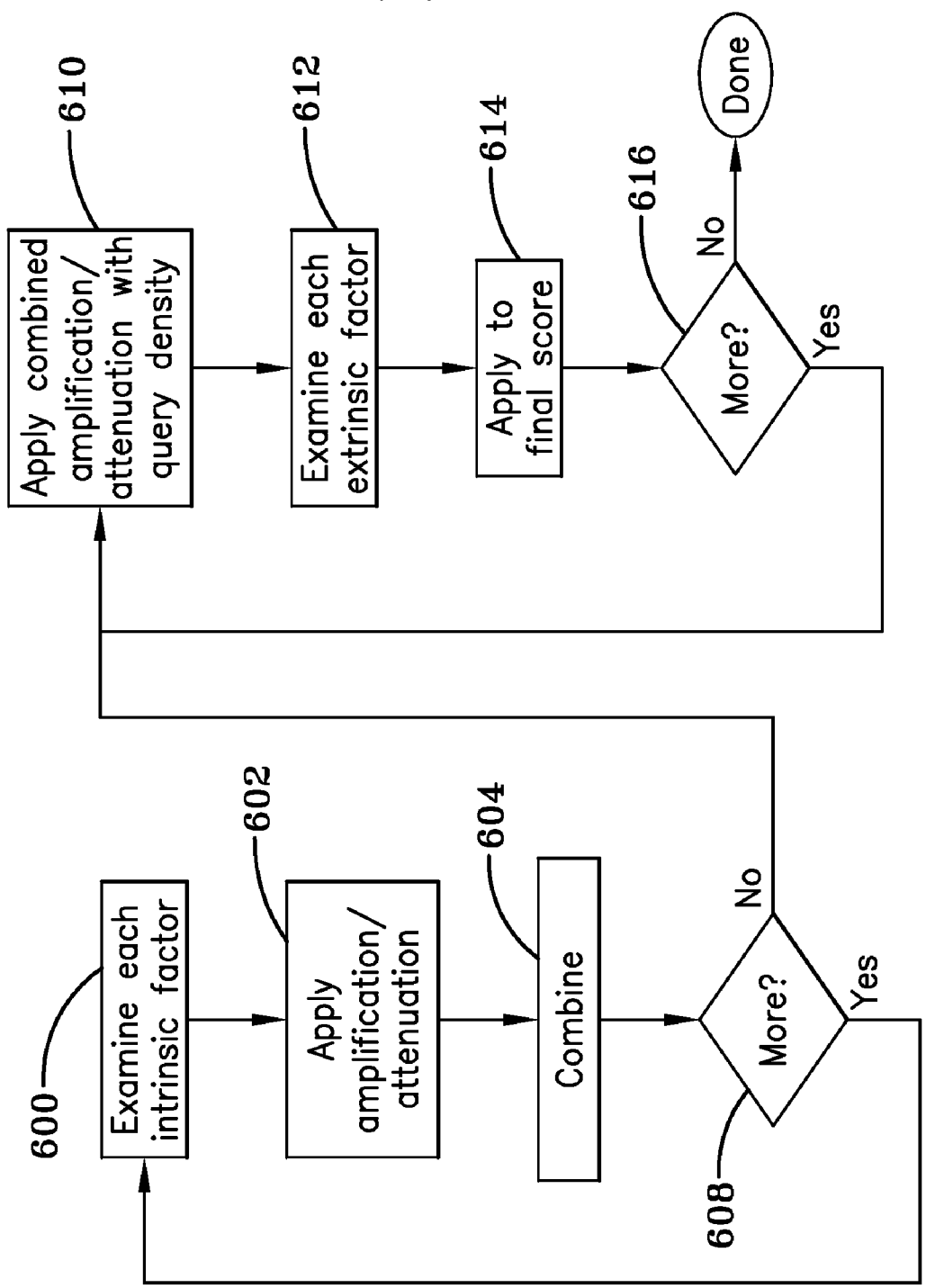
FIG. 6 illustrates the processing performed by the Sort Order Synthesizer component in order to determine a ranking score for a single matching item.

FIG. 6 illustrates the process used by the Sort Order Synthesizer component to determine a ranking score for a single matching item. For each intrinsic factor 600, 608 as determined by parameters acquired by the Ranking Control Harness, the attribute is either obtained from the item or from the Dynamic Attribute Writer, the specified amplification/attenuation factor is applied 602, and the result is combined with the previously computed factor via multiplication 604. Next, this combined value from the intrinsic factors is in turn combined with the item's query density from the Query Density Analyzer 610, 616. The combined factor is multiplied separately by each of the three counts recorded for the query density, those being multiplied by, for example, 10,000, 1,000, and 100 respectively 612, and the three products are summed to provide the final ranking score 614.

FIG. 7 outlines the logic used in the Multi Ranking Interleaver to create the final ordering when more than one ranking strategy is in use. The Sort Order Synthesizer will have created a ranking score for each of the ranking strategies. The first step involves creating a list of the items matching the query in order according to each of these scores 700. Then items are picked from the lists and placed into a final order list until all of the matching items have been so placed 702.

In preparation for picking an item from the lists, the distance from the next item in each list to the subsequent item in that list is computed by subtracting the scores corresponding to the strategy upon which the list in question is ordered, and normalizing that value by dividing by the total range of scores for that strategy 704. The item picked is the next item in the list whose next item is largest normalized distance from its successor in the list 706.

Once the next item has been picked 708, that item is marked in all lists so that it will identified as unavailable and never picked a second time, and a record is made of which list was picked 710 so that more than two successive picks from the same list can be avoided. The item is then appended to the final order list, and the process repeats 712 until no more available items remain 714.

Exemplary embodiments of a system and method for tailoring search results rankings have been provided. While certain processing and display features have been described in detail for the purpose of illustration, it is to be understood that search results rankings may be controlled in other ways using components of the present invention. Therefore, while certain embodiments of the present invention have been described in detail above, the scope of the invention is not to be considered limited by such disclosure, and modifications are possible without departing from the spirit of the invention as evidenced by the following claims:

The invention claimed is:

1. A computerized method for ranking and displaying search results comprising:
   (a) receiving at a server a query, said query comprising a plurality of search terms;
   (b) searching a database for items comprising said plurality of search terms;
   (c) creating a first list of said items wherein said items are ordered according to a first numeric score assigned to each of said items;
   (d) for each item on said first list, computing a distance value between adjacent items on said first list wherein said distance value is computed by subtracting numeric scores corresponding to said adjacent items;
   (e) normalizing each distance value for each item on said first list by dividing said distance value by a total range of numeric scores for said first list;
   (f) creating a second list of said items wherein said items are ordered according to a second numeric score assigned to each of said items;
   (g) for each item on said second list, computing a distance value between adjacent items on said second list wherein said distance value is computed by subtracting numeric scores corresponding to said adjacent items;
   (h) normalizing each distance value for each item on said second list by dividing said distance value by a total range of numeric scores for said second list;
   (i) creating a final order list for holding items from said first list and said second list, said final order list created by:
      (i) selecting an available item from said first list if the last item appended to said final order list was selected from said second list, wherein said available item from said first list has a largest normalized distance value from its successor in said first list;
      (ii) selecting an available item from said second list if the last item appended to said final order list was selected from said first list, wherein said available item from said second list has a largest normalized distance value from its successor in said second list;
      (ii) marking said selected item from said first list or said second list as unavailable;
      (iii) appending said selected item to said final order list;
      (iv) repeating steps (i)-(iii) until no more available items are in either said first list or said second list; and
   (j) providing at least a portion of items from said final order list to a computer user.

2. The computerized method of claim 1 wherein said first numeric score assigned to each of said items in said first list is computed by:
   (a) determining an order for said plurality of search terms;
   (b) determining whether said item terms matching said plurality of search terms are found in said item according to said order for said plurality of search terms;
   (c) computing a first count for a number of times said plurality of search terms occur in said item with no intervening words between said item terms;
   (d) computing a second count for a number of times said plurality of search terms occur in said item with at least one specified number of intervening words; and
   (e) calculating a composite score for said item by adding said first count and said second count.

3. The method of claim 2 wherein said at least one specified number is one.

4. The method of claim 2 wherein said at least one specified number is selected from the group consisting of the number of search terms and two times the number of search terms.

5. The method of claim 1 further comprising:
   (k) changing said first numeric score assigned to said items for a plurality of said items in said first list of said items;
   (l) reordering said items in said first list of items according to said changed first numeric scores for said first list of said items;
   (m) for each item on said first list, computing a distance value between adjacent items on said first list wherein said distance value is computed by subtracting numeric scores corresponding to said adjacent items;
   (n) normalizing each distance value for each item on said first list by dividing said distance value by a total range of numeric scores for said first list;
   (o) creating a final order list for holding items from said first list and said second list, said final order list created by:
      (i) selecting an available item from said first list if the last item appended to said final order list was selected from said second list, wherein said available item from said first list has a largest normalized distance value from its successor in said first list;
      (ii) selecting an available item from said second list if the last item appended to said final order list was selected from said first list, wherein said available item from said second list has a largest normalized distance value from its successor in said second list;
      (ii) marking said selected item from said first list or said second list as unavailable;
      (iii) appending said selected item to said final order list;
      (iv) repeating steps (i)-(iii) until no more available items are in either said first list or said second list; and
   (p) providing at least a portion of items from said final order list to a computer user.

6. A computerized method for ranking and displaying search results comprising:
   (a) receiving at a server a query, said query comprising a plurality of search terms;
   (b) searching a database for items comprising each of said plurality of search terms, said search terms found in one or more attributes of said items in said database;
   (c) adding said items comprising each of said plurality of search terms to a list;
   (d) assigning a numeric score to each of said items in said list wherein said numeric score indicates a relevance of said item to said plurality of search terms;
   (e) selecting at least one independent attribute of said items in said list wherein said attribute is not one of said attributes comprising one of said search terms;
   (f) defining at least one amplification factor for increasing a numeric score of an item in said list;
   (g) defining at least one attenuation factor for decreasing a numeric score of an item in said list;
   (h) applying said amplification factor to at least one attribute comprising at least of one said search terms or to said independent attribute;
   (i) applying said attenuation factor to at least one attribute comprising at least of one said search terms or to said independent attribute;
   (j) revising said numeric scores for items in said list according to said amplification factor applied to at least one attribute comprising at least of one said search terms or to said independent attribute;
   (k) revising said numeric scores for items in said list according to said attenuation factor applied to at least one attribute comprising at least of one said search terms or to said independent attribute;
(l) reordering said items in said list according to said revised numeric scores; and
(m) providing at least a portion of items from said reordered list to a computer user.

7. The method of claim 6 further comprising:
(n) changing said amplification factor;
(o) revising said numeric scores for items in said list according to said revised amplification factor applied to at least one attribute comprising at least of one said search terms or to said independent attribute;
(p) reordering said items in said list according to said revised numeric scores; and
(q) providing at least a portion of items from said reordered list to a computer user.

8. The method of claim 6 further comprising:
(n) changing said attenuation factor;
(o) revising said numeric scores for items in said list according to said revised attenuation factor applied to at least one attribute comprising at least of one said search terms or to said independent attribute;
(p) reordering said items in said list according to said revised numeric scores; and
(q) providing at least a portion of items from said reordered list to a computer user.

9. The method of claim 6 further comprising:
(n) defining additional amplification factors for increasing numeric scores of items in said list;
(o) defining additional attenuation factors for decreasing numeric scores of items in said list;
(p) applying said additional amplification factors to attributes comprising at least of one said search terms or to said independent attributes;
(q) applying said additional attenuation factors to attributes comprising at least of one said search terms or to said independent attributes;
(r) revising said numeric scores for items in said list according to said additional amplification factors and said additional attenuation factors applied to at attributes comprising at least of one said search terms or to said independent attributes;
(s) reordering said items in said list according to said revised numeric scores; and
(t) providing at least a portion of items from said reordered list to a computer user.

10. The method of claim 6 wherein said independent attributes are selected from the group consisting of language, popularity, and age of items in said list.

11. A computerized method ranking and displaying search results comprising:
(a) receiving at a server a query, said query comprising a plurality of search terms;
(b) searching a database for items comprising said plurality of search terms;
(c) creating a list of items found in said database;
(d) for each item in said list:
  (i) computing a first count for a number of times said plurality of search terms occur in said item with no intervening words between said item terms;
  (ii) computing a second count for a number of times said plurality of search terms occur in said item with at least one specified number of intervening words;
  (iii) calculating a composite score for said item by adding said first count and said second count; and
  (iv) associating said composite score with said item;
(e) ordering said items in said list according to said composite score assigned to each of said items; and
(f) providing at least a portion of items from said list to a computer user.

12. The method of claim 11 wherein said at least one specified number is one.

13. The method of claim 11 wherein said at least one specified number is selected from the group consisting of the number of search terms and two times the number of search terms.

14. The method of claim 11 wherein computing a first and second count for a number of times said plurality of search terms occur in sequence comprises counting occurrences of terms related to said search terms.

15. The method of claim 14 wherein terms related to said search terms comprise words selected from the group consisting of plural forms of said terms and alternate spellings of said terms.

* * * * *